Patented Aug. 10, 1954

2,686,190

UNITED STATES PATENT OFFICE 2,686,190

PHOSPHATIDE COMPOSITION

Noel W. Myers, Decatur, Ill., assignor to A. E. Staley Manufacturing Company, Decatur, Ill., a corporation of Delaware No Drawing. Application November 30, 1950, Serial No. 198,505

2 Claims. (Cl. 260—403)

This invention relates to phosphatide compositions and more particularly to a method for controlling the viscosity of such compositions.

Phosphatides occur widely in vegetable and animal matter, but the principal source of the commercially available form, often referred to as "lecithin," is soybeans. The phosphatides are present in the oil obtained from soybeans by pressure expelling or solvent extraction. The phosphatides are dissolved in the oil, but can be precipitated by the addition of water, as disclosed in U. S. Pat. No. 1,737,402. Since the precipitation of the phosphatides is apparently more efficient at elevated temperatures, this water may conveniently be added in the form of steam. It is generally considered that the phosphatides become hydrated, the amount of water required being relatively small, running up to about 5% of the weight of the oil treated.

Upon becoming hydrated, the solubility of the phosphatides in the soybean oil is greatly diminished and they tend to settle out, being of a slightly higher specific gravity than the oil. They may be conveniently separated from the oil by any method utilizing this difference in specific gravity, such as settling or centrifuging. Regardless of the method of separation, the phosphatides are normally recovered as a mixture rich in oil (glycerides) and water, with lesser amounts of other impurities, such as fatty acids and coloring matter. In this form, they are often referred to as "wet gums." This material is of an amorphous, jelly-like nature.

Due to the high moisture content of "wet gums," which may be on the order of 25% to 50%, depending upon operating conditions, fermentation is apt to commence immediately, resulting in spoilage of this material. Therefore, it is common commercial practice to remove a large part of this moisture in order to obtain a stable mixture of the oil and phosphatides. This drying is ordinarily effected in a steam jacketed, vacuum drier. The drying is a difficult operation and must be carefully performed in order to avoid damage to the product. As might be expected, the drying becomes increasingly difficult as the moisture level is progressively lowered, the phosphatides tenaciously holding the water of hydration and the drying rate rapidly diminishing. Thus, drying costs per unit of water removed rise progressively during this stage. Consequently, the mixture is customarily dried only to a moisture content where spoilage will not occur, i. e., down to about 2 to 6%.

The foregoing general process for the preparation of phosphatides is described in U. S. Patent No. 1,776,720.

The material thus obtained is the lecithin of commerce and ordinarily contains about one-third oil and about two-thirds phosphatides. The phosphatide content is commonly expressed in terms of amount of acetone insoluble (AI) material present, a standard AI value being in the vicinity of 65%. In the trade, 65% AI commercial lecithin is a familiar commodity. The portion insoluble in acetone is primarily a mixture of closely related phosphatides. The acetone soluble fraction is principally glyceride oil, with small amounts of fatty acids and miscellaneous impurities.

The commercial lecithin obtained by the foregoing procedure is a semi-solid of a consistency ranging from that of butter to that of wax or putty, depending upon such factors as the temperature of the material and the amount of oil present. Warming the material or adding more oil reduces its viscosity. While the lecithin is useful for some purposes in this form, for many uses it is desirable to convert it to a more fluid form. There have been many attempts to increase the fluidity of lecithin, including the obvious means of adding more oil or some other material which will fluidize the mixture. Most of these methods have disadvantages, among which is the tendency to reduce the AI value and introduce undesirable components.

Much research effort has been expended to overcome this problem and a number of patents have been issued for inventions in this field, including the following:

U. S. No. 2,194,842 discloses the addition of fatty acids to reduce the viscosity;

U. S. No. 2,374,681 discloses a method for reducing viscosity by the addition of sulfonic acids;

U. S. No. 2,391,462 describes a method for reducing viscosity by the addition of water and an acid;

U. S. No. 2,400,120 discloses a method comprising the use of an acid liberating compound;

U. S. No. 2,483,748 discloses a method utilizing fatty acid esters;

U. S. No. 2,494,771 discloses a method using an aliphatic acid.

It is a principal object of this invention to provide a fluid lecithin composition avoiding the disadvantages of the prior art compositions, such compositions being capable of production in an economical and feasible manner.

Another object is to provide a method for the preparation of fluid lecithin which does not involve the introduction of any fluidizing agents.

An equally important object is to provide a method for the control of the fluidity or viscosity of such compositions.

It has been unexpectedly discovered that a fluid lecithin composition is obtained when the drying of lecithin is carried to a point far beyond any previous practice. To accomplish this abnormal drying, it is necessary to provide vacuum drying equipment provided with pumps capable of reducing the pressure to at least 10 mm. and preferably lower. In general, the moisture content must be reduced to a value below 1%, although it is to be emphasized that the degree of moisture reduction required to produce a certain fluidity will be related to such factors as the free fatty acid (FFA) and AI content. For commercial lecithin, such as produced by the above outlined procedure, having ordinarily an AI content of about 65 to 70% and a FFA of about 1.5 to 2.5%, the moisture must be reduced to a value below about 0.75% to obtain a product which would be considered a commercial fluid grade, such as has heretofore been obtained by the addition of fluidizing agents.

Also, it has been discovered that over a limited moisture content range, at this low level, the fluidity or viscosity of lecithin is directly related to the water content (other variables being held constant) and may therefore be controlled by regulating the extent of drying. This drying to such a low moisture level can be effected by using equipment of proper design provided with adequate controls, because high vacuum must be obtained and excessive temperatures avoided to prevent damage to the product. A temperature of about 140° F. has been adopted, although this may be varied considerably, if desired. At lower temperatures, the drying rate is reduced; at higher temperatures the lecithin may be damaged and the color becomes darker, so a practical upper limit is about 200° F., though some has been dried at 240° F. without excessive damage. It is also necessary to thoroughly agitate the lecithin throughout the drying operation.

The following examples will serve to illustrate the invention:

*Example 1*

A quantity of wet gums was obtained by the water degumming of solvent (hexane) extracted soybean oil, the gums being separated from the oil by use of a centrifuge. The wet gums were placed in a steam-jacketed, vacuum drier equipped with an agitator and a temperature regulating device serving to maintain the temperature at about 135° F. The drying operation was now started and samples were removed periodically to determine the moisture content and viscosity. This particular batch had an AI value of 67.3% and an FFA of 1.6% on a dry substance basis (DSB).

Determinations indicative of the viscosity of the samples were made with a Gardner mobilometer at 77° F. (room temperature) after the samples had been held for 24 hours at 77° F. according to a standard procedure on all tests. The mobilometer readings in the tables indicate the time in seconds required for a 200 g. weighted, perforated disc to sink through a standard distance of 10 centimeters in a cylinder containing the sample. The moisture determinations were made by the Karl Fischer method.

| Water content (percent) | Mobilometer |
|---|---|
| 2.06 | (1) |
| 1.21 | (1) |
| 0.89 | (1) |
| 0.80 | (1) |
| 0.72 | (64) |
| 0.38 | (52) |
| 0.10 | (43) |
| 0.05 | (32) |

[1] Not fluid, no motion or extremely slow.
(NOTE.—The numerals in parenthesis represent samples of such low viscosity as to be pourable and termed "fluid.")

The data in Example 1 indicate that the lecithin did not become fluid (pourable) until the moisture content was reduced to 0.72%. Note that at still lower levels it became still more fluid. This leads to the conclusion that, at this low moisture level, the degree of fluidity can be controlled by proper regulation of the extent of drying.

*Example 2*

Another batch of wet gums prepared as in Example 1 was dried at 150° F. This batch analyzed 68.9% AI and 1.8% FFA (DSB). During the later stages of the drying, samples were removed at intervals and the AI adjusted by the addition of refined soybean oil.

| Sample No. | Water Content | Acetone Insoluble Content | | |
|---|---|---|---|---|
| | | 68.9% | 66.9% | 64.9% |
| 1 | 1.36 | (1) | (1) | (1) |
| 2 | 1.02 | (1) | (1) | (1) |
| 3 | 0.85 | (1) | (1) | 260 |
| 4 | 0.71 | 262 | 126 | (61) |
| 5 | 0.51 | 125 | (62) | (32) |
| 6 | 0.18 | (47) | (35) | (14) |

[1] Not fluid, no motion or extremely slow.
(NOTE.—The numerals in parenthesis represent samples of such low viscosity as to be pourable and termed "fluid.")

The data in Example 2 clearly indicate the effect on viscosity of varying the AI and water contents. As the AI value decreases, less drying is required to produce a fluid product.

*Example 3*

Another batch of wet gums prepared as in Example 1 was dried at 170° F. During the later stages of the drying, samples were removed at intervals and the FFA adjusted by the addition of soybean fatty acids. This batch analyzed 67.9% AI and 1.9% FFA (DSB).

| Sample No. | Water Content | Free Fatty Acid Content | | | |
|---|---|---|---|---|---|
| | | 1.91% | 2.91% | 3.91% | 4.91% |
| 1 | 2.4 | (1) | (1) | (1) | (1) |
| 2 | 0.73 | (1) | (41) | (31) | (30) |
| 3 | 0.38 | (78) | (38) | (31) | (29) |
| 4 | 0.26 | (55) | (37) | (30) | (25) |

[1] Not fluid, no motion or extremely slow.
(NOTE.—The numerals in parenthesis represent samples of such low viscosity as to be pourable and termed "fluid.")

The data in Example 3 supports the expectation that as the FFA content is lowered, more drying is required to yield a fluid grade lecithin.

As will be apparent from a study of the data in the examples, experimental work has shown a close interrelationship among AI, FFA and water content as regards their effect on viscosity of lecithin. The reduction in water content required to produce a fluid grade is greater as the AI content increases and/or the FFA content decreases. Mathematically, this may be expressed as:

$$V \sim \frac{AI \times W}{FFA}$$

where V is viscosity, W is water content and AI and FFA have their usual significance.

The study of this relationship has been largely confined to the ranges of AI and FFA found in various commercial grades of soybean lecithin, i. e. about 60–70% AI and 1 to 5% FFA. At the seldom occurring AI values of 70 to 75, the reduction of water content alone may not be effective to impart fluidity to a sample of lecithin; the FFA value will then be critical and must be raised in a proportion about equal to the increase in AI content above 70%.

Ordinary commercial plastic grade lecithin, as obtained by the water degumming of soybean oil and without the addition of any chemical agents, is a preferred raw material for practising this invention. This material is of a plastic or waxy consistency and has an AI content of about 65 to 70%, an FFA of about 1.5 to 2.5% and a water content of about 2 to 6%. Drying of this material to a very low moisture content, according to this invention, yields a fluid, pourable lecithin. For practical, commercial purposes it is desirable to set the final permissible maximum water content at about 0.3%, to allow for minor variations in AI and FFA values and thus insure that a fluid, pourable grade lecithin is always obtained. It was found desirable to reduce the pressure during vacuum drying to about 3 to 5 mm. to obtain this low moisture level.

There is no sharp line of demarcation between a fluid and a non-fluid lecithin. In general, the trade considers a fluid grade lecithin to be one which will pour at ordinary room temperatures. In the data here presented, the values of viscosity below about 100 are considered fluid, i. e. they represent samples of lecithin which can be poured from a container at reasonable rates of flow.

According to the principle of this invention, a nonfluid commercial lecithin of normal AI, FFA and water content can be converted to a fluid lecithin by reducing the moisture content to the low level contemplated by this invention. The exact amount of water which must be removed to obtain a given fluidity and the final water content, will depend upon the FFA and AI values.

The soybean oil normally associated with the lecithin can be removed with a solvent (such as acetone) and replaced with another liquid glyceride oil, if desired, but such equivalents are intended to be covered by this invention.

That which is claimed as new is:

1. The process of preparing a fluid phosphatide composition from wet gums comprised essentially of soybean phosphatides, soybean oil and water, which comprises reducing the water content of said composition to not more than about 0.3%, said reduction being accomplished by vacuum drying at a pressure not exceeding about 10 mm., with agitation, at a temperature not exceeding about 200° F.

2. A fluid phosphatide composition consisting essentially of phosphatides and glycerides derived from soybean oil, said composition having a water content of not more than approximately 0.3%, an acetone insoluble (AI) value of about 60 to 70%, a free fatty acid (FFA) value of about 1 to 5%, and a fluidity of not more than approximately 78 seconds at 77° F.

References Cited in the file of this patent

UNITED STATES PATENTS

| Number | Name | Date |
|---|---|---|
| 1,893,393 | Bollmann et al. | Jan. 3, 1933 |
| 2,013,804 | Klein et al. | Sept. 10, 1935 |
| 2,029,261 | Ginn | Jan. 28, 1936 |
| 2,356,382 | Christiansen | Aug. 22, 1944 |
| 2,371,476 | Sifferd | Mar. 13, 1945 |
| 2,555,137 | Karjala et al. | May 29, 1951 |
| 2,555,972 | Karjala et al. | June 5, 1951 |